(12) United States Patent
Reynolds et al.

(10) Patent No.: US 6,826,414 B1
(45) Date of Patent: Nov. 30, 2004

(54) MOBILE COMMUNICATIONS SYSTEM HAVING A CELLULAR COMMUNICATIONS NETWORK COMPRISING A PUBLIC NETWORK PORTION AND A PRIVATE NETWORK PORTION USING A COMMON RADIO INTERFACE PROTOCOL

(75) Inventors: Philip Reynolds, Bristol (GB); Anila Jacob, Bristol (GB); Timothy Haysom, North Somerset (GB); Martin Stubbs, Bristol (GB)

(73) Assignee: Orange Personal Communciations Services Ltd., Bristol (GB)

( * ) Notice: Subject to any disclaimer, the term of this patent is extended or adjusted under 35 U.S.C. 154(b) by 0 days.

(21) Appl. No.: 09/214,917

(22) PCT Filed: Jan. 31, 1997

(86) PCT No.: PCT/GB97/00290
§ 371 (c)(1),
(2), (4) Date: Nov. 26, 1999

(87) PCT Pub. No.: WO98/02008
PCT Pub. Date: Jan. 15, 1998

(30) Foreign Application Priority Data

Jul. 10, 1996 (GB) ............................................. 9614463

(51) Int. Cl.[7] ............................................. H04M 1/00
(52) U.S. Cl. ................. 455/555; 455/432.1; 455/432.5; 455/435.2; 455/554.1
(58) Field of Search ............................. 455/33.1, 56.1, 455/34.1, 53.1, 54.1, 54.2, 422, 426, 432–434, 435, 552–554, 560, 445, 465, 463, 555, 461–462, 550; 379/156–158, 198; 370/328–330, 310, 535, 337–338

(56) References Cited

U.S. PATENT DOCUMENTS

| | | | | |
|---|---|---|---|---|
| 5,255,307 A | * | 10/1993 | Mizikovsky ................. | 379/58 |
| 5,406,615 A | * | 4/1995 | Miller, II et al. ............. | 379/59 |
| 5,448,619 A | * | 9/1995 | Evans et al. ................... | 379/58 |
| 5,537,415 A | * | 7/1996 | Miller et al. ............... | 370/95.1 |
| 5,574,775 A | * | 11/1996 | Miller, II et al. ............. | 379/60 |
| 5,680,440 A | * | 10/1997 | Ghisler et al. ................. | 379/58 |
| 5,722,068 A | * | 2/1998 | Bartle et al. ................. | 455/421 |
| 5,732,347 A | * | 3/1998 | Bartle et al. ................. | 455/421 |
| 5,818,824 A | * | 10/1998 | Lu et al. ...................... | 370/328 |
| 5,870,677 A | * | 2/1999 | Takahashi et al. .......... | 455/463 |
| 5,884,168 A | * | 3/1999 | Kolev et al. ............. | 455/432.1 |
| 5,887,256 A | * | 3/1999 | Lu et al. ...................... | 455/426 |
| 6,014,563 A | * | 1/2000 | Szabo ......................... | 455/435 |
| 6,018,655 A | * | 1/2000 | Bartle et al. ................. | 455/421 |
| 6,070,081 A | * | 5/2000 | Takahashi et al. .......... | 455/463 |
| 6,075,981 A | * | 6/2000 | Shah et al. ................. | 455/403 |
| 6,112,088 A | * | 8/2000 | Haartsen ..................... | 455/437 |
| 6,456,843 B1 | * | 9/2002 | Daly .......................... | 455/419 |
| 6,463,286 B1 | * | 10/2002 | Salminen .................... | 455/453 |

FOREIGN PATENT DOCUMENTS

| | | |
|---|---|---|
| EP | 0 452 290 A1 | 10/1991 |
| EP | 0 465 444 A1 | 1/1992 |
| GB | 2 253 968 | 9/1992 |
| GB | 2 282 730 | 4/1995 |
| GB | 2 284 964 | 6/1995 |
| GB | 2 285 198 | 6/1995 |
| GB | 2 285 555 | 7/1995 |
| GB | 2 289 191 | 11/1995 |
| GB | 2 296 626 | 7/1996 |
| WO | WO 94/23527 | 10/1994 |
| WO | WO 95/23488 | 8/1995 |
| WO | WO 96/38992 | 12/1996 |

* cited by examiner

*Primary Examiner*—Pablo N. Tran
(74) *Attorney, Agent, or Firm*—Knobbe Martens Olson & Bear LLC

(57) ABSTRACT

A public mobile communications network is configured in accordance with an established protocol which includes a private network portion to which only a selected set of mobile stations have access. The selected set of mobile stations has a private network identity code which is different from a public network identity code. A base transceiver station of the private network portion broadcasts the private network identity code on its broadcast control channel. A mobile switching center prevents public subscriber mobile stations from registering via the private network portion, while the private subscriber mobile stations are allowed to register over the entire network.

33 Claims, 9 Drawing Sheets

| PREFERRED PLMN LIST | |
|---|---|
| 1 | PUBLIC PLMN CODE |
| 2 | — — — |
| 3 | — — — |
| 4 | — — — |

| FORBIDDEN PLMN LIST |
|---|
| PRIVATE PLMN CODE |
| — — — |
| — — — |
| — — — |

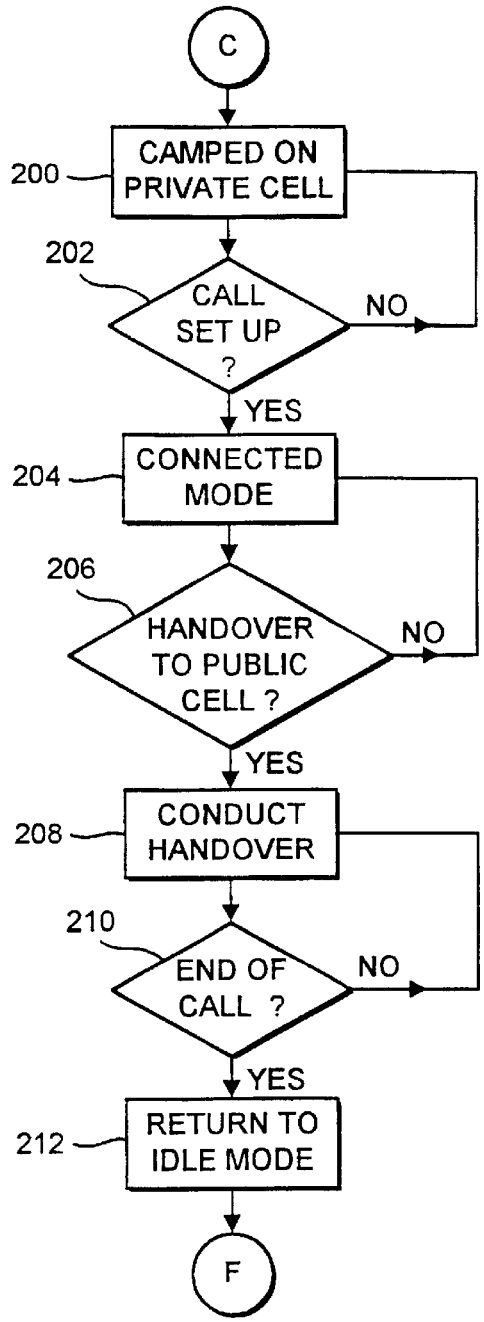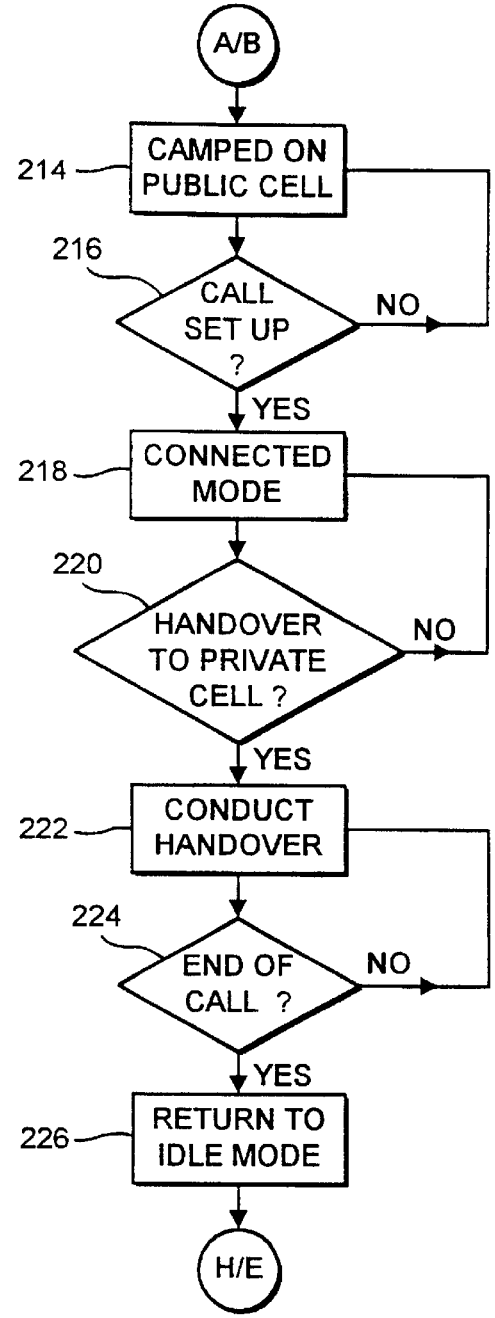
FIG. 12
FIG. 13

MOBILE COMMUNICATIONS SYSTEM HAVING A CELLULAR COMMUNICATIONS NETWORK COMPRISING A PUBLIC NETWORK PORTION AND A PRIVATE NETWORK PORTION USING A COMMON RADIO INTERFACE PROTOCOL

FIELD OF THE INVENTION

This invention relates to a mobile communications network, in particular but not exclusively to a cellular radio communications network, such as a GSM (Global System for Mobile Communications) digital cellular radio network.

BACKGROUND OF THE INVENTION

A known conventional GSM network, referred to as a public land mobile network (PLMN), is schematically illustrated in FIG. 1. A mobile switching centre (MSC) 2 is connected via communication links to a number of base station controller (BSCs) 4. The BSCs 4 are dispersed geographically across areas served by the mobile switching centre 2. Each BSC controls one or more base transceiver stations (BTSs) 6 located remote from, and connected by further communication links to, the BSC. Each BTS 6 transmits radio signals to, and receives radio signals from, mobile stations 8 which are in an area served by that BTS. That area is referred to as a "cell". A GSM network is provided with a large number of such cells, which are ideally contiguous to provide continuous coverage over the whole network territory.

A mobile switching centre 2 is also connected via communications links to other mobile switching centres in the remainder of the mobile communications network 10, and to a public service telephone network (PSTN), which is not illustrated. The mobile switching centre 2 is provided with a home location register (HLR) 12 which is a database storing subscriber authentication data including the international mobile subscriber identity (IMSI) which is unique to each mobile station 8. The IMSI is also stored in the mobile station in a subscriber identity module (SIM) along with other subscriber-specific information.

The IMSI consists of a string of digits, including a mobile country code, indicating the home country of the mobile, a home public land mobile network (PLMN) code, indicating the home mobile network of the mobile station, an HLR code indicating the identity of the HLR in which the subscriber information is stored, and a subscriber identity number identifying the subscriber in the HLR.

The mobile switching centre is also provided with a visitor location register (VLR) 14 which is a database temporarily storing subscriber authentication data including the temporary mobile subscriber identity (TMSI) which uniquely identifies a mobile station in the VLR, for mobile stations which are active in the area served by the mobile switching centre 2. Before subscriber authentication data is entered in a VLR, the subscriber is authenticated by accessing the subscriber's HLR.

Because more than one GSM public land mobile network may operate in a particular territory, each such network is assigned a unique home PLMN code.

A mobile station 8 may move between cells served by the same or different mobile switching centres belonging to the same network without interruption in service. All mobile stations 8 in this known GSM mobile communications network, provided they are current subscribers, generally have access to the entire network.

However, in the event of congestion in a particular cell, a network operator may employ a cell access control mechanism provided for by the GSM standard (see GSM technical specification 3.22). On subscription, one or more access control classes are allocated to the subscriber and stored in the SIM. Access to a cell by certain subscribers may be prevented by omitting the corresponding access control classes from access control information broadcast by the cell BTS. This does not however prevent the excluded mobile stations attempting to register with the cell. Excluded mobile stations tend to lock onto an access-controlled cell without receiving service for significant periods of time. This access control mechanism is therefore rarely used by the GSM network operators.

Cordless telephone systems for use in both large and small business concerns and residential applications are known. One such system is the DECT standard, which provides for communication between mobile and fixed parts of a radio system via a radio interface. A DECT cordless private branch exchange (PABX) can be connected to a GSM network to receive calls from the GSM network. Such an arrangement is described in international patent publication number WO 95/01074. In such an arrangement the cordless telephone is not compatible for direct access to the main GSM network, since it uses DECT signalling protocols which are different to GSM signalling protocols. The private branch exchange performs protocol interfacing to allow a call to be routed from the GSM public land mobile network to the cordless telephone. Thus, the cordless telephone can only be used close to the PABX.

U.S. Pat. No. 5,448,619 describes the provision of a private cellular mobile communications system within an area served by a public cellular system. The strength of the control channel for the private cellular system is increased to attempt to ensure that mobile stations within the coverage area of the private system attempt first to register on the private system. Public system mobile units are turned away when attempting to register. The private cellular system includes a receiver for receiving broadcast control signals from the public cellular system. The private system is otherwise provided with independent means for radio interfacing, subscriber authentication, call management, etc.

British patent publication number 2285556 describes a personal base station which is compatible with the GSM system. The personal base station is connected directly to a single telephone line in a PSTN, or ISDN, and a limited number of GSM functions are performed by the personal base station. This includes keeping a list of allowed mobile station numbers which have access to communications via the personal base station and register with it. The personal base station is provided with a personal cell identification which is entered in a PLMN list for the mobile station, so that an authorised mobile station will lock onto the broadcast control channel of the personal base station. This arrangement is intended only to support a single mobile communications call connection at any one time. Thus, the mobile station acts as a cordless telephone when close to the personal base station, or a mobile telephone when away.

A proposal for "parallel network architecture" has been made for use in the GSM system, as described in "Mobile Radio Technology", Gordon White, published by Butterworth/Heinemann Limited in 1994. According to this proposal, physical components of a GSM system can be shared by different network operators. The different operators, which use different network identity (PLMN) codes, may share a base station, and the shared base station will transceive at all the different frequency bands for which the operators are respectively licensed. Mobile stations therefore communicate exclusively with the frequencies which their own operator utilises. It will be appreciated that this arrangement relates to two different networks, which have one or more shared physical components in common.

SUMMARY OF THE INVENTION

According to the present invention a mobile communications network is provided which comprises a main network portion assigned a first network identity code for communicating with a mobile station, and an additional network portion assigned a second network identity code, different to said first network identity code, for communicating with said mobile station said network identity codes being of the type used by said mobile station for distinguishing said mobile communications network from different mobile communications networks.

Herein, the term "network portion" is intended to mean a part of the mobile communications network, whereby communications can be established with a mobile station. Thus, for example, in a GSM-type system, a network portion will generally include one or more BTSs.

An advantage of the invention is that the benefits of a mobile communications network can be provided for the additional network portion as well as the main network portion, whilst the two different portions can conveniently be distinguished by the use of different network identity codes.

Preferably, the additional network portion rejects from service mobile stations using the first network identity code. This allows the additional network portion to be configured as a private communications facility for use by mobile stations using the second network identity code only, thereby relieving congestion in use of the private, communications facility.

Conversely, the main network portion preferably accepts for service either mobile stations using the first network identity code or mobile stations using the second network identity code. This allows the main network portion to be made available for use by mobile stations using the second network identity code. Thereby, mobile stations using the first network identity code can obtain service throughout the network coverage. In addition, insufficient capacity problems in the additional network portion can be alleviated by servicing overflows via the main network portion.

The main network portion and the additional network portion preferably operate using frequencies within the same operator allocated frequency group, which allows the network operator to utilise the same frequency band or bands for which it is licensed as a main network operator, in the additional network portion.

In a cellular system, the main network portion is preferably adapted for handing over a mobile station from the additional portion to the main network portion and/or from said main network portion to said additional portion, when a call is in progress. Calls can then be continued even when a mobile station moves outside the range of one of the network portions.

BRIEF DESCRIPTION OF THE DRAWINGS

A description of preferred embodiments of the invention will now be described, by way of example only, with reference to the accompanying drawings in which:

FIG. 8 is a flow chart showing the behaviour of a public subscriber mobile station at switch on;

FIG. 9 is a flow chart showing the behaviour of a private subscriber mobile station at switch on;

FIG. 12 is a flow chart showing a procedure for handing over a call on a private subscriber mobile station from a private cell to a public cell; and FIG. 13 is a flow chart showing a procedure for handing over a call on either a public or private subscriber mobile station from a public cell to a private cell.

DETAILED DESCRIPTION OF THE INVENTION

The Network

Figure 1:
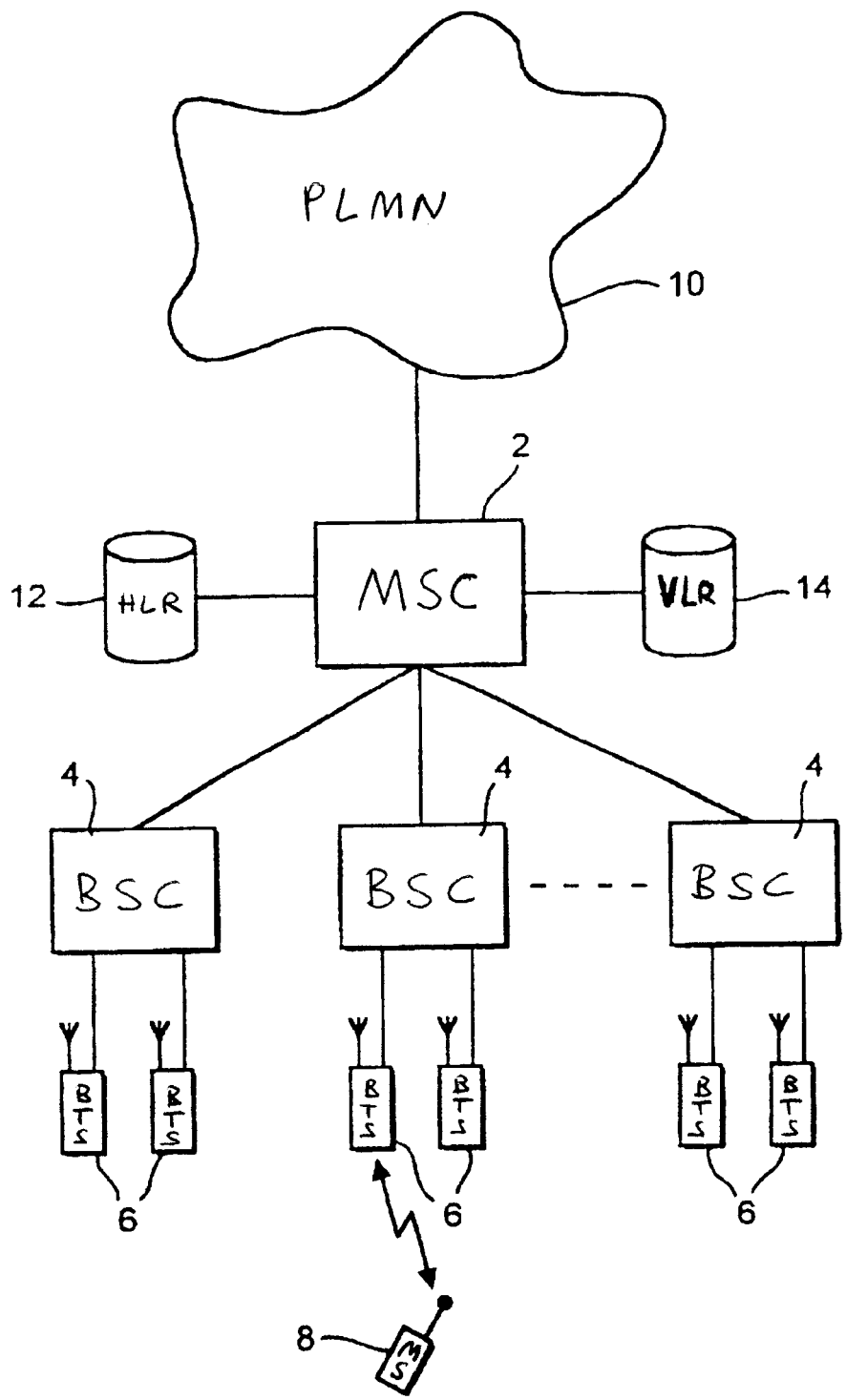
FIG. 1 is a block diagram of a prior art mobile communications network.
Figure 2:
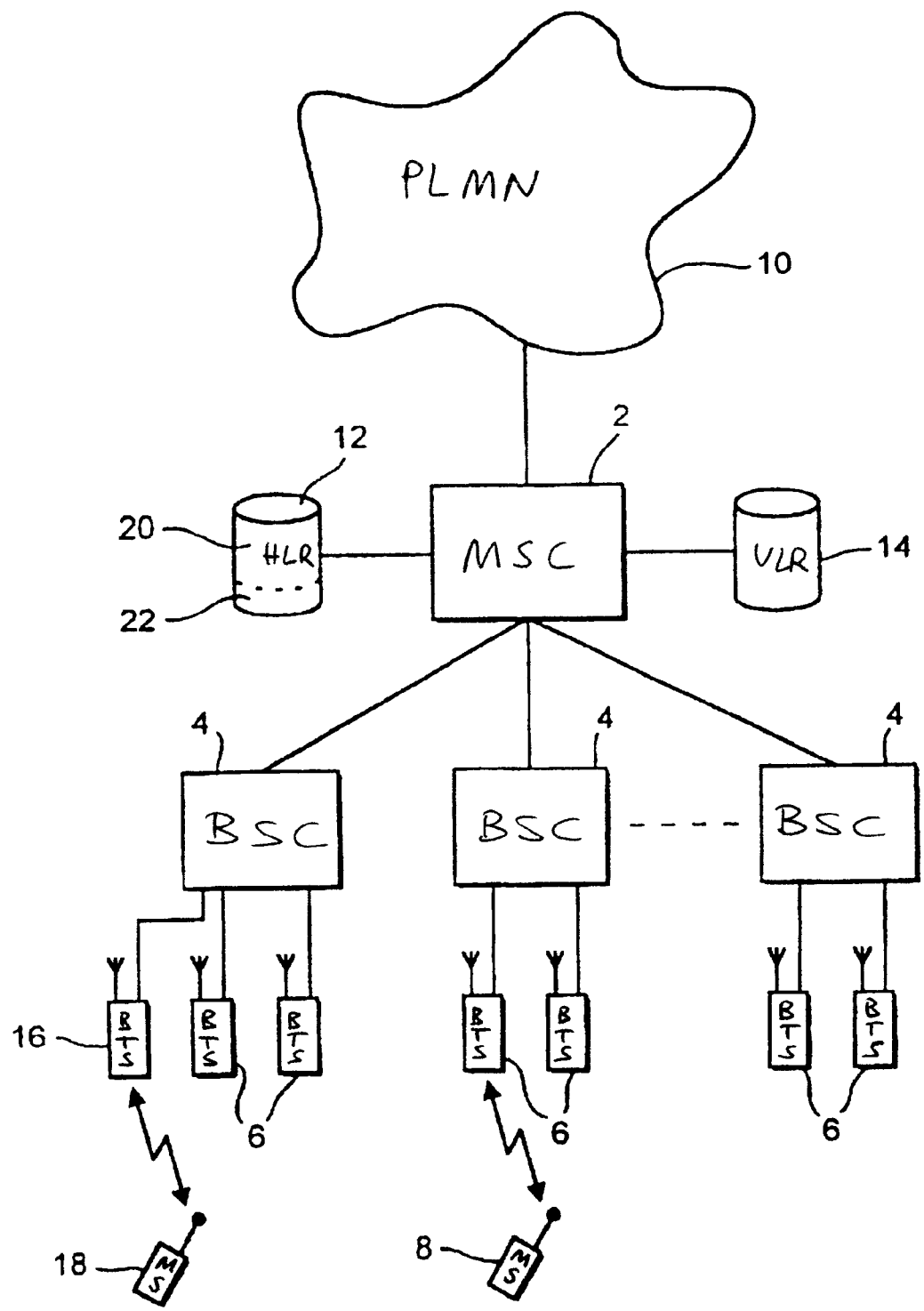
FIGS. 2 and 3 are block diagrams of mobile communications networks according to embodiments of the present invention.

Reference is made to FIG. 2. Components already described in relation to FIG. 1 are referred to by the same reference numerals. The network is modified by the provision of an additional base transceiver station 16 and a set of private subscriber mobile stations 18 which use a private PLMN code which is different to the public PLMN code of the main network. Furthermore, the mobile switching centre 2 and the home location register 12 are modified to serve the additional base station 16. These modifications are explained in more detail below.

Each of the private subscriber mobile stations 18 has the private PLMN code stored in its SIM as its home PLMN code. The private PLMN code forms part of its subscriber identity (IMSI) as prescribed by the GSM protocol.

The additional BTS 16, which functions compatibly with the main network BSCs 4, is controlled by its serving BSC 4 to broadcast the private PLMN code, rather than the public PLMN code (which is broadcast by the public network portion BTSs 4), on its broadcast control channel (BCCH). The BTS 16 may for example be located inside a building to provide in-building coverage. Accordingly, the transmit power of the BTS 16 can be on average lower than that of the main network BTSs 6, which generally have a wider coverage area.

The MSC 2 is modified to enable it to receive and respond to a service request originating from a private subscriber mobile station 18, transmitted via the additional BTS 16. The home location register 12 is modified to store subscriber authentication data relating not only to the public subscriber mobile stations 8, but also to the private subscriber mobile stations 18. That is to say, the HLR is functionally divided to contain a first portion 20 storing subscriber authentication details for the public subscriber mobile stations 8, grouped according to the public subscriber PLMN code, and a second portion 22 storing subscriber authentication details for the private subscriber mobile stations 18, grouped according to the private PLMN code.

Figure 3:
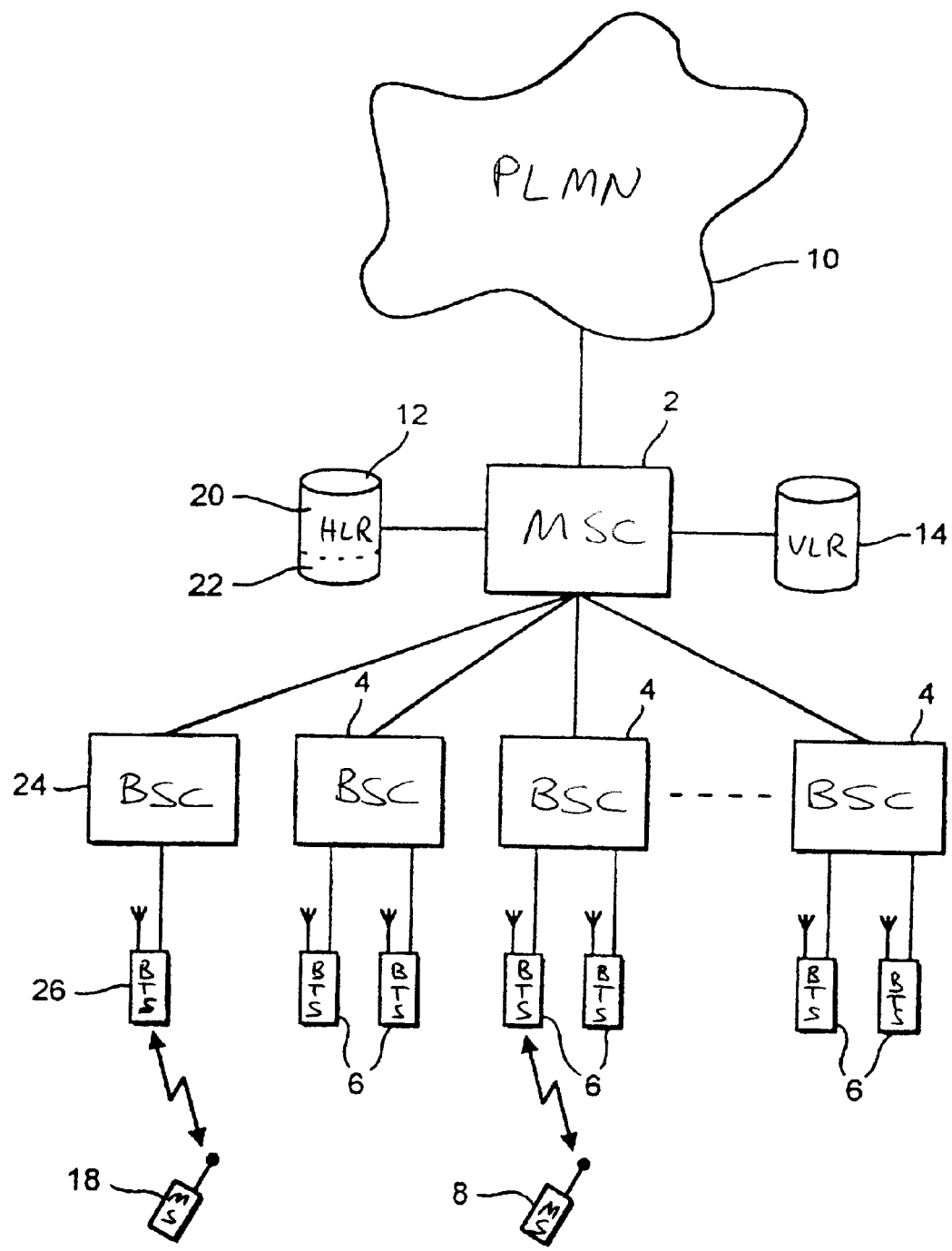

Whereas in the embodiment of FIG. 2 a single BSC 4 serves both BSCs in the public portion of the network and in the private portion of the network, each broadcasting different PLMN codes on their BCCHs, this need not be the case. Referring to FIG. 3, in a different embodiment of the invention, an additional BSC 24 is provided, which serves exclusively in the private network portion. The BSC 24 serves an additional BTS 26, which broadcasts the private PLMN code on its BCCH and functions in a similar fashion to the additional BTS 16 in the embodiment of FIG. 2.

The Mobile Stations

Figures 4, 5, 6:
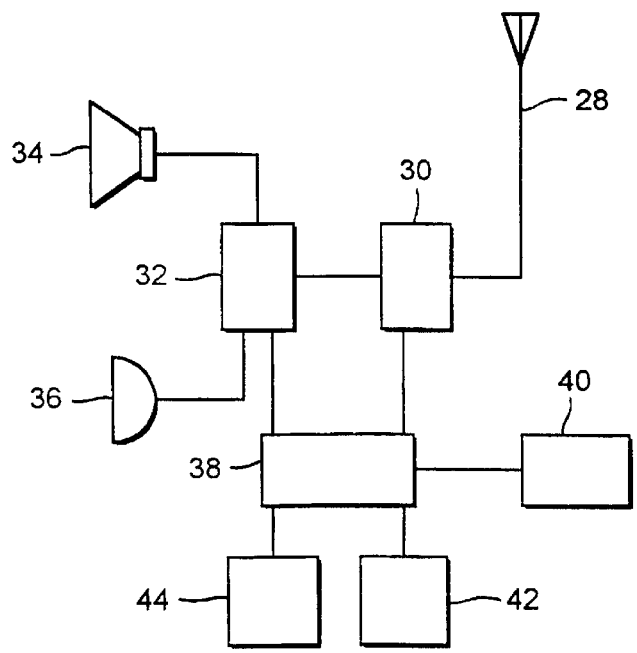
FIG. 4 is a block diagram of a mobile station.
FIGS. 5 and 6 illustrate lists stored in the memory of mobile stations.

The public subscriber mobile stations 8 and the. private subscriber mobile stations 18, in embodiments of the invention, are digital mobile communications handsets, for example as specified by GSM specifications. Referring to FIG. 4, a mobile station 8 or 18 comprises a transmit/receive aerial 28, a radio frequency transceiver 30, a speech coder/decoder 32 connected to a loud speaker 34 and a microphone 36, a processor circuit 38, an LCD display 40, a manual input port (keypad) 42 and a removable subscriber identity module (SIM) 44 which provides a subscriber-specific data storage medium accessible by the processor circuit 38.

The SIM 44 of the mobile station, as previously described, stores the IMSI of the subscriber. This contains the home PLMN code of the subscriber.

In addition, the SIM stores in a memory field a preferred PLMN list and, in a different memory field, a forbidden PLMN list. Referring to FIG. 5, the private subscriber mobile stations 18 store, either permanently or temporarily, the public PLMN code in the preferred PLMN list. The preferred PLMN list is ordered by priority. The public PLMN code is given the status of most preferred alternative to the private PLMN code, which is the home PLMN code of the private subscriber mobile station. The public PLMN code may be preprogrammed into the preferred PLMN list before sale of the SIM. In a first alternative, the public PLMN code may be automatically entered into the preferred PLMN list when the public network portion is first accessed by the mobile station. In a second alternative, the public PLMN code may be manually programmed by use of the keypad 42.

Referring now to FIG. 6, the public subscriber mobile stations 8 store in a forbidden PLMN memory field, either permanently or temporarily, the private PLMN code. The private PLMN code will generally be entered into the forbidden PLMN list of the public subscriber mobile station when it is first rejected from service by the private network portion.

Network Registration

Figure 7:
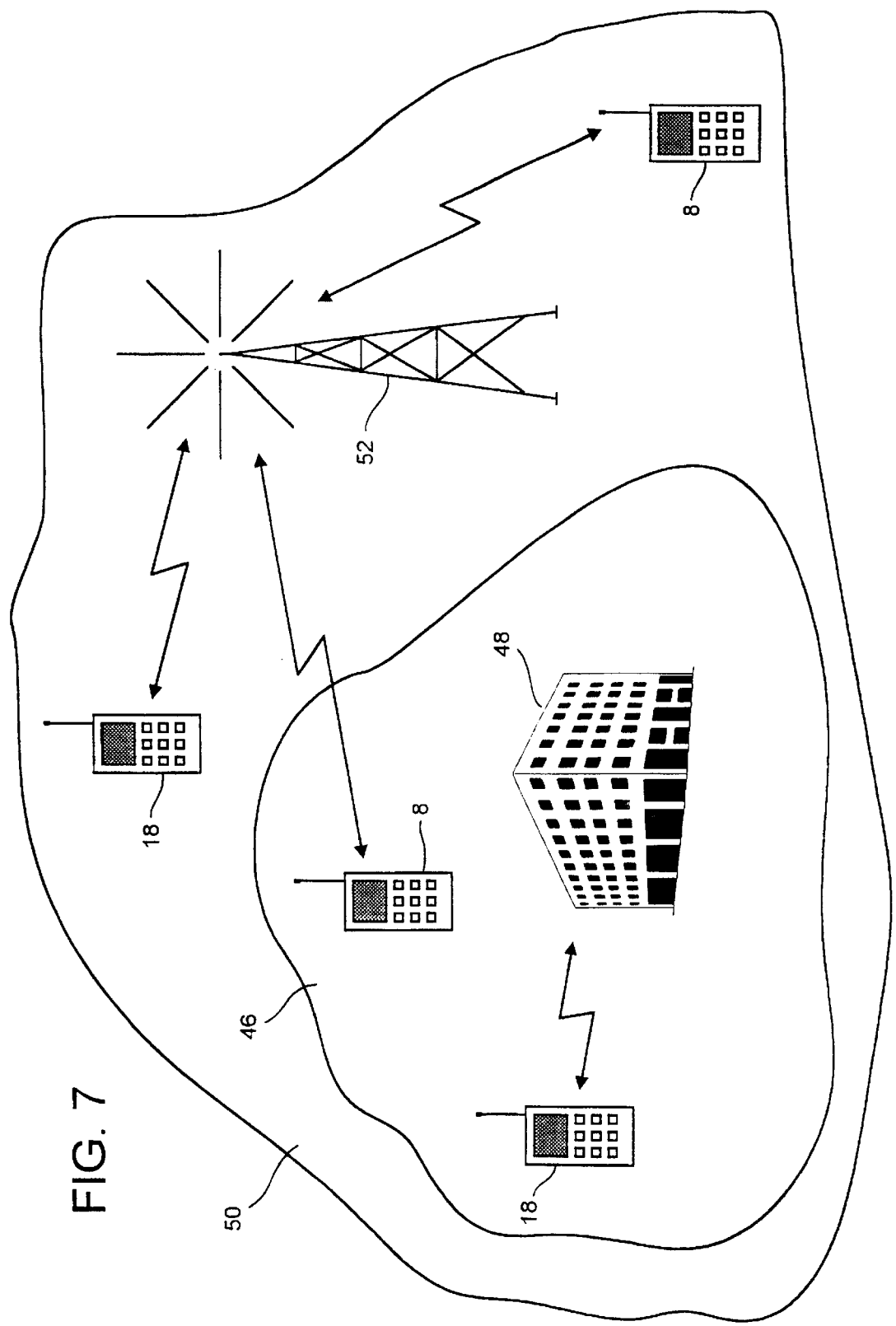
FIG. 7 is a schematic illustration of a part of a network of the present invention.

FIG. 7 schematically illustrates the principle of these embodiments of the present invention. A private cell 46, served by a private network portion BTSs 16 or 26 located within a building 48, is located within the coverage area of the public network portion. A public cell 50 is served by a single public network portion BTS 6, transceiving from an antenna mast 52. For the sake of simplicity, the private network portion is represented by only a single public cell in FIG. 7. In practice however, the public network portion may be in the form of a public communications network operating in a large number of cells, more than one of which may be overlapped by the private cell 46.

A public subscriber mobile station 8 will generally obtain service on the public network portion cell 50, irrespective of whether the mobile station 8 is within the private cell 46. On the other hand, a private subscriber mobile station 18 can obtain service, as will be described later, on the private cell 46 when inside that cell, and on the public cell 50 when inside or outside the private cell 46.

When preparing to register with a network for service, a mobile station successively camps on to the BCCH frequencies and monitors the BCCH signals received from different cells in its surrounding area. When monitoring a cell's BCCH signals, the mobile station checks the signal strength and decodes at least that part of the information transmitted on the BCCH which indicates the PLMN code of the BTS which is transmitting, to determine whether it is a suitable cell to attempt to register onto.

To register with the private cell 46, a mobile station transmits a location update request, which contains the subscriber IMSI or TMSI, via the additional base station 16 or 26 to the MSC 2 along with the identity of the servicing cell. The MSC identifies that the location update request is transmitted via the private network portion and checks if the subscriber identity is stored in the second portion 22 of the HLR 12.

In the case of a private subscriber mobile station 18, the location update request will be accepted, and the MSC 2 will transmit a location update acceptance signal to the private subscriber mobile station 18 via the additional base station 16.

The private subscriber mobile station 18 will then be registered in idle mode on the private network portion BTS 16 or 26. It can receive all services provided by the public network, including short messaging, incoming calls, outgoing calls, voice mail, and other services provided by the public network operator. In the alternative, since communications occurring via the private network portion can be distinguished from communications occurring via the public network portion station 4, by means of the PLMN code used, a modified set of services and/or a different tariff of call charges may be associated with the private cell 46.

The private cell 46 can be preferentially selected by an automatic or manual PLMN selection procedure performed by the mobile station 18, as will be described below. However, when the private subscriber mobile station 18 moves out of coverage of the private cell 46, it is forced to attempt to communicate via the public cell 50. Because the public cell 50 and the private cell 46 are identified with different location areas, a location update is required.

A private subscriber mobile station is authorised not only for communications via the private cell 46, but also via the public network portion served by the public network BTSs 4. The MSC 2 verifies authorisation of a mobile station to obtain service via the public network portion, on receipt of a location update request from a mobile station, by checking whether its authentication details are stored in either the first portion 20 or the second portion 22 of the HLR 12.

A private subscriber mobile station 18 outside the coverage of the private cell 46 will attempt to location update on the public network portion in preference to a third party network using a further different PLMN code, because the private subscriber mobile station has the public PLMN code stored as a most preferred alternative PLMN code in its SIM.

A public subscriber mobile station 8 has its authentication details, including its IMSI containing the public PLMN code, stored in the first portion 20 of the HLR 12. Communications via the public network portion occur in a known fashion and will not be described further.

A public subscriber mobile station 8 is not authorised to register with the private cell 46. A public subscriber mobile station 8 will generally have the private PLMN code stored in its forbidden PLMN list, and therefore will not attempt to register on the private cell 46. However, in the rare case that a public subscriber mobile station 8 does not yet have the private PLMN code stored in its forbidden PLMN list and attempts to register on the private cell 46 (for example, when the mobile station is outside the coverage of the public network portion but inside the private cell 46), the MSC 2 identifies that the IMSI of the mobile station 8 contains a public PLMN code, and rejects the mobile station 8 from service on the private cell 46. The private PLMN code is then stored on the public subscriber mobile station's SIM as a forbidden PLMN code. The public subscriber mobile station 8 will then not in future attempt to register on the private cell 46.

Thus, major disruption to service for the public subscriber mobile stations 8 is conveniently avoided. Furthermore, the public subscriber mobile stations can be prevented from overloading the facilities provided by the private network portion.

Reference is now made to FIGS. 8 to 11, which are flow charts illustrating steps taken by the mobile stations 8 and 18 for registration on the private network portion, the public network portion, or any other unforbidden public network which is available.

Figure 8:
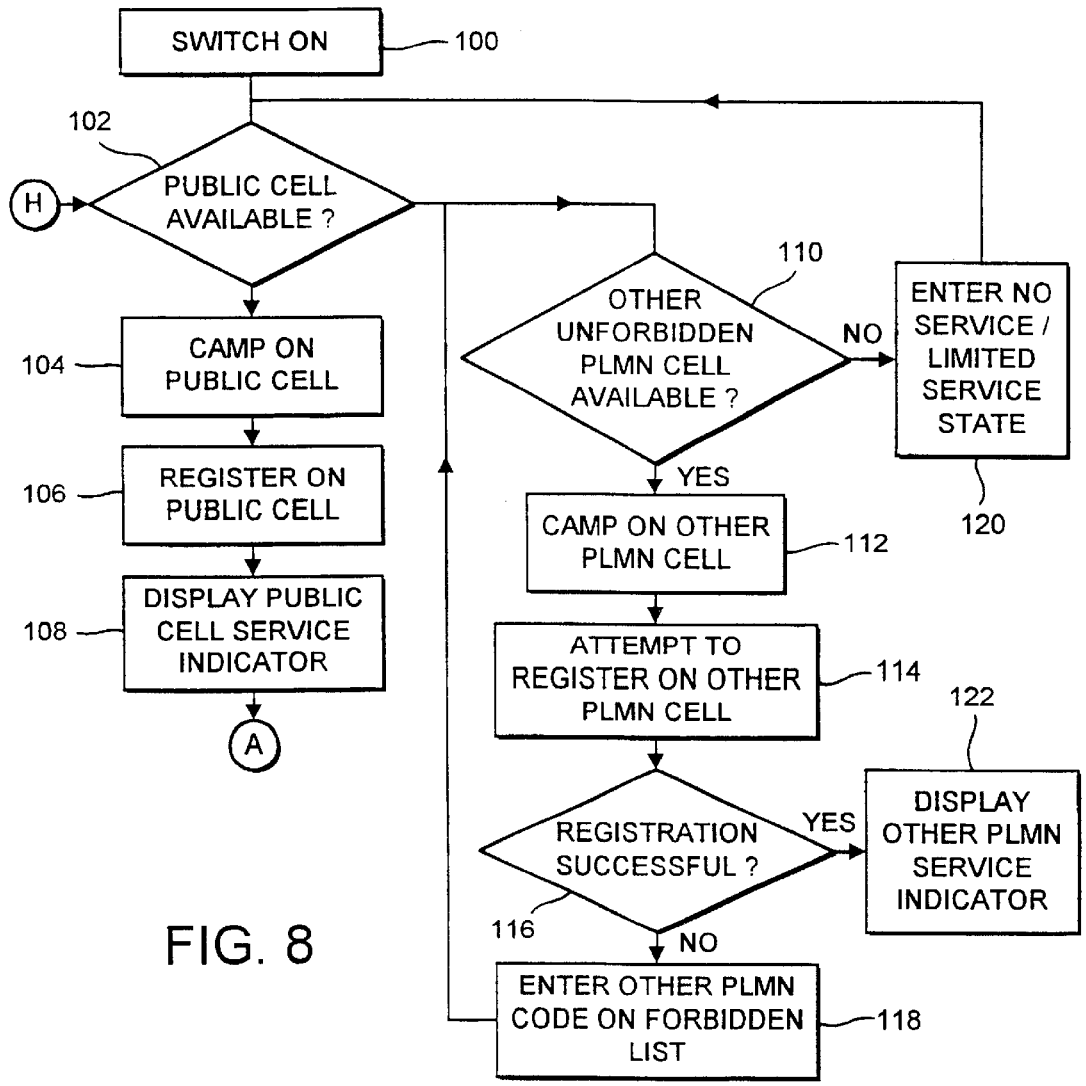

FIG. 8 illustrates the behaviour of a public subscriber mobile station at switch on. The public subscriber mobile station 8 is assumed here to have been registered on a public network portion cell before switch off. The public PLMN is stored as the last registered PLMN in the SIM of the mobile station 8. Thus, at switch on 100, the mobile station checks if a public cell is available in step 102. A cell is taken as available if its downlink signal strength is sufficient, and if the cell is not somehow otherwise barred for access by the public subscriber mobile station 8. If available, the mobile station camps on the public cell in step 104 and proceeds to register in step 106, as previous described. On receipt of confirmation of registration on the public cell, the mobile station 8 shows on its display 40 a service indicator identifying the public network portion in step 108.

If on the other hand a public cell is unavailable, the mobile station 8 will check whether there are any other available cells broadcasting different PLMN codes, which are not present on the mobile station's PLMN forbidden list in step 110. In the absence of a roaming agreement between the network operator and a different PLMN network operator, other PLMN cells will generally be either unavailable or forbidden. In that case, the mobile station will enter a no service or limited service state in step 120, waiting for public cell coverage to become available. Even in the absence of a roaming agreement, the mobile station 8 may still attempt to register on a cell of a different PLMN which does not yet appear in its PLMN forbidden list, taking steps to camp on 112 and attempt to register 114. However, registration will be unsuccessful in step 116 and as a result the PLMN code on which the mobile station attempted to gain service will be entered in the mobile station PLMN forbidden list in step 118. If a roaming agreement with the relevant network operator has however been entered into, registration will be successful, and the mobile station will remain camped on the other PLMN cell and will display the other PLMN service indicator in step 122.

Figure 9:
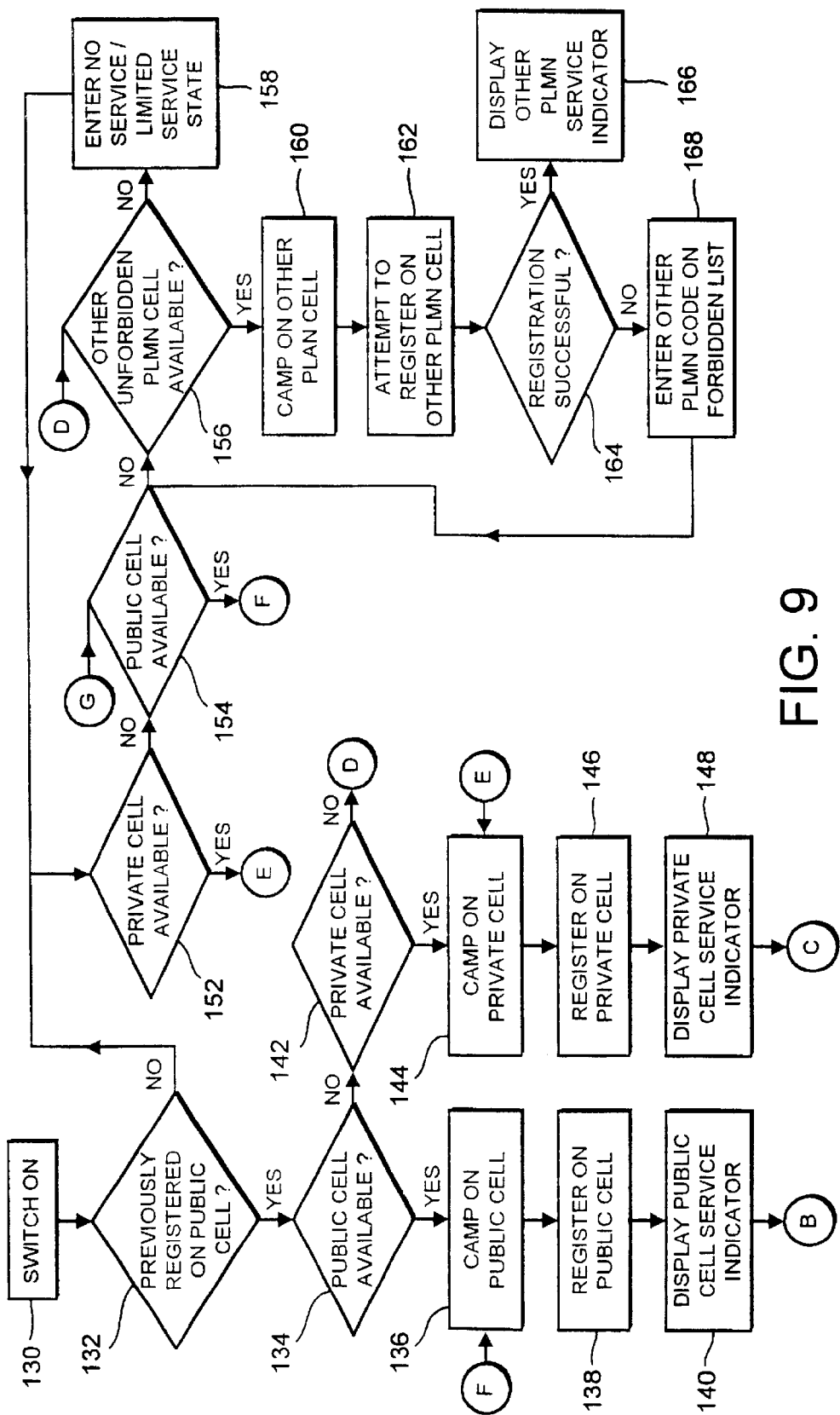

FIG. 9 illustrates the behaviour of a private subscriber mobile station 18 at switch on. It is assumed that the mobile station was previously registered either on the public network portion or on the private network portion (rather than on any other network). After switch on 130, if the mobile station 18 was previously registered on a public cell, a check whether a cell broadcasting the public PLMN on its BCCH is available is made in steps 132 and 134. If a public cell is available, the mobile station 18 camps on and registers on the public cell, and displays the public cell service indicator as previous described in step 136, 138 and 140. If no public cell is available, the mobile station 18 next checks if a cell broadcasting its home PLMN code (the private PLMN code) is available. If the private cell 46 is found to be available in step 142, the mobile station 18 camps on the private cell 46 in step 144 and conducts registration on the private cell in step 146. On receipt of confirmation of registration on the private cell 46, the mobile station 18 displays a private cell service indicator in step 148.

On the other hand, if the mobile station 18 was at switch on previously registered on the private cell, it checks whether a cell broadcasting the private PLMN code is available in step 152. If no private cell is available, the mobile station proceeds next to step 154 in which it checks whether a public PLMN code-broadcasting cell is available. It takes this step because the public PLMN code is stored in its SIM as a most preferred alternative PLMN code in the preferred PLMN list. If a public cell is available, the mobile station 18 proceeds to step 136. If no public cell is available, the mobile station proceeds to check whether there are any other available cells broadcasting PLMN codes which are not on its PLMN forbidden list in step 156. If not, the mobile station enters a no service or limited service state in step 158, in which it attempts to find available cells by returning to step 152. If the mobile station finds an available cell in step 156, it camps on 158 and attempts to register 160. If registration is successful in step 164, the mobile station 18 displays the newly registered PLMN service indicator in step 166. If not, it enters the other PLMN code on its forbidden list and returns to step 156.

Figure 10:
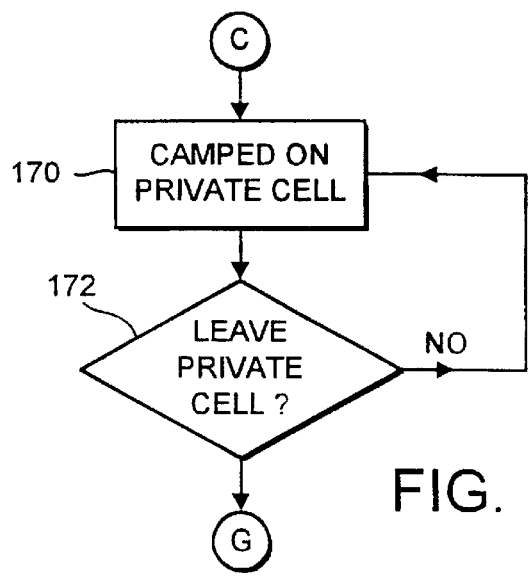
FIG. 10 is a flow chart showing a procedure for a private subscriber mobile station when leaving a private cell in idle mode.

FIG. 10 is a flow chart illustrating a procedure followed by the private subscriber mobile station when it leaves the private cell 46 after it has registered with the private cell. Although initially camped on the private cell in step 170, when the mobile station 18 leaves the private cell in step 172, it attempts to find a cell broadcasting its most preferred alternative PLMN code in step 154 (the public PLMN code) and continues the PLMN search procedure followed after that step at switch on.

Figure 11:
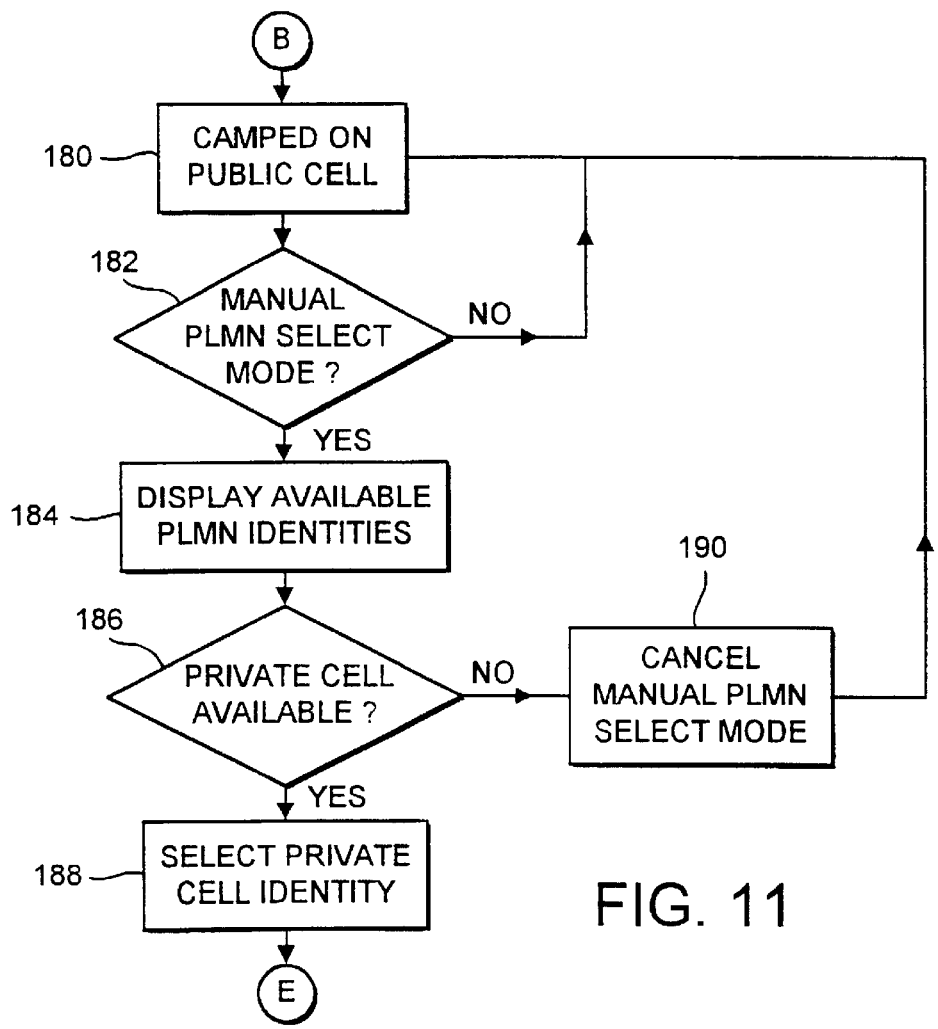
FIG. 11 is a flow chart showing a procedure for manual selection of a private cell when a private subscriber mobile station is camped on a public cell in idle mode.

FIG. 11 illustrates a procedure whereby a subscriber can force a private subscriber mobile station, when registered on a public cell but when located within the private cell 46, to register on the private cell. When camped on a public cell in step 180, the subscriber enters manual PLMN select mode in step 182. The mobile station 18 then searches, within its allocated frequency band, for available cells of any PLMN and displays the available PLMN identities in step 184. If the mobile station 18 is within the private cell 46, the private cell should be available in step 186, and the user can select the private cell identity in step 188. The mobile station will then proceed to step 144, camping on and registering with the private cell for service on the private cell. If the mobile station is however outside the private cell, the subscriber can cancel the manual PLMN select mode in step 190.

A subscriber can also force a private subscriber mobile station to, when registered on a public cell but when within private cell coverage, register on the private cell 46, with the mobile station in automatic PLMN select mode. When in automatic PLMN select mode, a private cell mobile station will automatically attempt registration on the private cell, if available, when an automatic PLMN re-selection procedure is initiated by the user.

As will be understood from the above, both the manual PLMN select procedure and the automatic PLMN select procedure can be initiated by the user to transfer a private subscriber mobile station to receive service from the private cell 46, when within its coverage.

Handover

The private network portion BTS 16 or 26 and the public network portion BTSs 4 are implemented in the same network. Inter-cell handovers are conducted by a BSC 4 or the MSC 2 when necessary. Each cell BTS broadcasts on its BCCH information identifying the BCCH frequencies of adjacent cells to which handover can be made, along with a network colour code (NCC) permitted list and the cell's own NCC.

Thus, referring to FIG. 12, when a private subscriber mobile station 18 is camped on the private cell 46 in step 200 and a call is set up in step 202, the mobile station enters connected mode in step 204. When a call is in progress, a mobile station monitors these adjacent cell BCCH frequencies, provided the NCC corresponds to one on the NCC permitted list, to determine whether the difference in signal strength is such that handover should be conducted.

The BTS 16 or 26 of the private cell 46 is adapted to broadcast the BCCH frequencies for adjacent cells in the public network portion, even though the cells have different PLMN codes. Thus, if a call is initiated on a private subscriber mobile station 18 via a private network portion BTS 16 or 26, and the mobile station subsequently moves outside the private cell 46, handover to a public cell can be conducted in steps 206 and 208. When the call ends at step 210, the mobile station returns to idle mode in step 212. Because a new location area has been entered, the mobile station 18 then moves to step 136 and performs registration on the new public cell.

Handover in connected mode service from a public cell to the private cell 46 may not be necessary, particularly when the private network portion overlaps in coverage with the public network portion. In that case, continuous service can be achieved even within the private cell, on the public network portion. Thus, according to one embodiment, the network is configured so that no calls will be handed over to the private cell.

In another embodiment, calls can be handed over to the private cell. The private cell BCCH frequency and the private cell NCC are broadcast in data contained on the BCCH of public network portion cells adjacent to the private network portion. Because registration on a new cell is conducted only after the end of a call, calls on either a public subscriber mobile station 8 or a private subscriber mobile station 8 may be handed over to the private cell, if it is determined that, during the call, the ratio of signal levels of the public and private cells is such that handover to the private cell 46 is desirable. This procedure is illustrated in FIG. 13.

The procedure in steps 214 to 226 is similar to that described in relation to the procedure illustrated in FIG. 12. However, at the end of the call, when the mobile stations are respectively returned to idle mode, each mobile station will detect that it has obtained service on the private cell 46. In the case of a public subscriber mobile station 8, the private PLMN is stored in its PLMN forbidden list, and the public subscriber mobile station 8 will immediately attempt to re-register on a surrounding public cell, returning to step 102 in the procedure after switch on. A private subscriber station 18 on the other hand will immediately camp on the private cell BCCH and register, moving to step 144 of the procedure followed after switch on.

Frequencies

The frequency channels used by the additional private cell 46 are the same as frequency channels used by at least some of the public network portion BTSs 4. Interference can be minimised by conventional cellular frequency re-use schemes. By using in the private network portion frequency channels allocated to the PLMN operator for the public network portion, the need for the network operator to license additional parts of the frequency spectrum for the private network portion, which may not even be possible, is avoidable.

Display of Service Indicator

A private subscriber mobile station 18 is adapted to display a private service indicator when the mobile station 18 is being served by the private network portion, and to display a public service indicator when the mobile station is being served by the public network portion.

In the one embodiment, the current serving PLMN code determines the service indicator displayed on the mobile station 18. The serving PLMN code is stored in a field in the memory of the mobile station's SIM. When the serving PLMN code changes, the processor circuit 38 causes the service indicator display to change in response thereto correspondingly.

In a second embodiment, the cell identity code of the cell forming the private network portion is stored in a field in the memory of the mobile stations SIM.

The service indicator displayed on the mobile station display 40 is changed in response to detection by the processor circuit 38 of the stored cell identity code in the BCCH of the serving cell. The private cell identity code may be entered into the SIM memory of the mobile station 18 by the subscriber manually, or may be preprogrammed into the SIM.

In a third embodiment, a predetermined dedicated control signal identifying or specifying the private service indicator is broadcast in the private cell. When the processor circuit 38 of mobile station 18 detects this control signal in the BCCH of the current serving cell, it changes its service indicator display accordingly.

Further Details

Incorporated herein by reference are the further details of implementation of a mobile communications network provided in the GSM technical specifications, in particular GSM 03.22 (for functions related to mobile stations in idle mode), GSM 03.09 (for handover procedures) and GSM 05.08 (for radio subsystem link control). These can be obtained from the European Telecommunications Standards Institute (ETSI).

Other Embodiments

Although in the above embodiments the private network portion has included only a single private cell, it will be appreciated that a number of private cells may be included in a private network portion, by the appropriate provision of further BTSs 16 or 26.

Thus, although only one additional BTS is shown to be part of the private network portion in the embodiments of both FIG. 2 and 3, more than one such BTS may be provided, and they may be connected to more than one public network portion ESC 4 and/or more than one private network portion BSC 24.

Furthermore, a number of private network portions may be provided in a network. Each private network portion would have an associated set of private subscriber mobile stations 18. All such portions and sets could have the same home PLMN code (the private PLMN code). The likelihood of a private network portion mobile station associated with one registering with a cell of a different private network portion will be relatively small. Even if a private subscriber mobile station did communicate via the incorrect private network portion, the effect of this on the capacity of that private network portion would be relatively small. It would also be possible to provide more than one private PLMN code for use in different private network portions, in particular when a number of such zones are located within close vicinity of one another.

In the preferred embodiments described, both the public subscriber mobile station 8 and the private subscriber mobile station 16 are of the type which, at switch on, attempts first to camp on to a cell on which it last obtained service before switch off. However, the mobile stations may be of a different type or may embody a number of different PLMN searching procedures at switch on. In a different PLMN searching procedure, the mobile station attempts first to camp on to a cell broadcasting its home PLMN code at switch on. The public mobile subscriber station of this type would follow the procedure illustrated in FIG. 8 at switch on. A private subscriber mobile station of this type would on the other hand follow the procedure beginning at step 152 in FIG. 9, rather than at step 132, at switch on.

Further, the private subscriber mobile stations may be configured to periodically search for a cell broadcasting the private PLMN code, i.e. its home PLMN code, when it is, once in idle mode, registered with a cell broadcasting a different PLMN code. Thus, if then within coverage of the private cell, a private subscriber mobile station of this configuration would automatically register with and obtain service on the private cell when a periodic attempt to obtain service on its home PLMN is initiated.

It will be understood that the network identity code described in relation to the above embodiments need not be broadcast on a BCCH, but may be broadcast on any appropriate signalling channel.

The additional network portion provided need not be a private network portion—it may be a network portion in which a modified set of services or call tariffs is available, possibly only to a select group of mobile stations using a network identity code which is different to that used by the remainder of the mobile stations.

Although the description thus far has related in particular to a network implemented according to at least some GSM protocols (such as a GSM, PCN or DCS 1800 network), the present invention is applicable to any mobile communications network which utilises a network identity code for distinguishing the network from a different mobile communications network using the same radio interface protocols. These network identity codes, which are generally transmitted in the same format in different networks using the same radio interface protocols, are traditionally used so that signals using the same radio interface protocols, but associated with different networks, are distinguishable from those associated with a selected network, or a network to be selected.

In the case of the present invention, a mobile communications network comprises a main network portion assigned a first network identity code (such as a PLMN code) for communication with a mobile station, and an additional portion assigned a second network identity code (for example an artificial PLMN code) for communicating with a mobile station. This allows a private network portion providing a desired level of service to be added to a main mobile communications network utilising protocols already established regarding the use of a network identity code to distinguish between networks. Such a private network portion can also be realised without the need for significant modification to the mobile network components other than for compatibility with the new PLMN code or codes. The benefit of the features of the main mobile network can thus be conferred readily upon the users of mobile stations associated with the private network portion.

An artificial mobile country code could be used as a network identity code in place of or in addition to a private PLMN code to assign a network identity code to a private portion of a network which is different to that of the public portion.

The mobile station may be a mobile communications unit of any form, including a pager, a vehicle-based telephone, etc.

It will be appreciated that various other variations and modifications could be employed in relation to the embodiments described above.

What is claimed is:

1. A mobile communications system, comprising:
   a first plurality of mobile stations;
   a second plurality of mobile stations different from said first plurality of mobile stations; and
   a cellular communications network comprising:
   a first network portion comprising a plurality of radio access cells,
   a second network portion comprising one or more radio access cells, and
   a single subscriber register configured to control network access for both said first and second plurality of mobile stations to said first and second network portions;
   wherein said first plurality of mobile stations are configured to be able to register for service with said subscriber register in both said first and said second network portions, wherein said second plurality of mobile stations are configured to be able to register for service with said subscriber register in said first network portion but are prevented from registering for service with said subscriber register in said second network portion, and wherein said first plurality of mobile stations are configured to preferentially select to register for service with said second network portion rather than said first network portion.

2. The mobile communications system of claim 1, wherein said second network portion comprises a base station controller which exclusively serves said second network portion.

3. The mobile communications system of claim 1, further comprising a base station controller which serves both said first and second network portions.

4. The mobile communications system of claim 1, wherein said first and said second network portions operate using radio frequencies within a single operator-allocated frequency group.

5. The mobile communications system of claim 1, wherein the system is adapted to hand over service of said first plurality of mobile stations between said first network portion and said second network portion.

6. The mobile communications system of claim 5, wherein the system is further adapted to hand over service of said first plurality of mobile stations from said second network portion to said first network portion when a call is in progress in said second network portion.

7. The mobile communications system of claim 5, wherein the system is further adapted to hand over service of said first plurality of mobile stations from said first network portion to said second network portion when a call is in progress in said first network portion.

8. The mobile communications system of claim 5, wherein the system is further adapted to prevent hand over of service of any selected one of said second plurality of mobile stations from said first network portion to said second network portion when a call is in progress in said first network portion.

9. The mobile communications system of claim 1, wherein said radio interface protocol is in accordance with a technical specification selected from a plurality of mobile communications standards, said mobile communications standards including a global standard for mobile communications (GSM).

10. The mobile communications system of claim 1, wherein the system is configured so that different charging tariffs or sets of services are available to said first plurality of mobile stations in said second network portion than in said first network portion.

11. The mobile communications system of claim 1, wherein said first plurality of mobile stations are configured to store a network portion identity code of said second network portion as a preferred network portion identity code.

12. The mobile communications system of claim 1, wherein said second plurality of mobile stations are configured to store a network portion identity code of said first network portion as a preferred network portion identity code.

13. The mobile communications system of claim 1, wherein said first plurality of mobile stations are configured to employ a radio access searching procedure at power on, the radio access searching procedure causing the mobile station to preferentially select to register for service with said second network portion rather than said first network portion.

14. The mobile communications system of claim 1, wherein said first plurality of mobile stations are configured to periodically employ a radio access searching procedure when registered for service outside said second network portion, the radio access searching procedure causing the mobile station to preferentially select to register for service with said second network portion.

15. A method of operating a mobile communications system having a cellular communications network comprising a first network portion and a second network portion using a common radio interface protocol and a single subscriber register accessible by both network portions, a first plurality of mobile stations configured to register for normal service in both said first network portion and said second network portion, and a second plurality of mobile stations configured to register for normal service in said first network portion and prevented from registering for normal service in said second network portion, the method comprising:

transmitting a first network portion identity code to said second plurality of mobile stations in said first network portion;

transmitting a second network portion identity code to said first plurality of mobile stations in said second network portion; and controlling network access for said first plurality of mobile stations and said second plurality of mobile stations to said first and second network portions with said single subscriber register, said first plurality of mobile stations preferentially selecting to register for service with said second network portion rather than said first network portion.

16. A method of operating a mobile communications system having a cellular communications network comprising a first network portion and a second network portion using a common radio interface protocol and a single subscriber register accessible by both network portions, a first plurality of mobile stations configured to register for normal service in both said first network portion and said second network portion, and a second plurality of mobile stations configured to register for normal service in said first network portion and prevented from registering for normal service in said second network portion, the method comprising:

transmitting a first network portion identity code to said second plurality of mobile stations in said first network portion;

transmitting a second network portion identity code to said first plurality of mobile stations in said second network portion; and controlling network access for said first plurality of mobile stations and said second plurality of mobile stations to said first and second network portions with said single subscriber register, said first plurality of mobile stations displaying a first service indicator in response to being registered with said first network portion and a second, different, service indicator in response to being registered with said second network portion.

17. A mobile communications system, comprising:

a first plurality of mobile stations;

a second plurality of mobile stations different from said first plurality of mobile stations; and a cellular communications network comprising:
  a first network portion comprising a plurality of radio access cells,
  a second network portion comprising one or more radio access cells, and
  a single subscriber register configured to control network access for both said first and second plurality of mobile stations to said first and second network portions, wherein said first plurality of mobile stations are configured to be able to register for service with said subscriber register in both said first and said second network portions, and wherein said second plurality of mobile stations are configured to be able to register for service with said subscriber register in said first network portion but are prevented from registering for service with said subscriber register in said second network portion, said first plurality of mobile stations being configured to display a first service indicator in response to being registered with said first network portion and a second, different, service indicator in response to being registered with said second network portion.

18. The mobile communications system of claim 17, wherein said first plurality of mobile stations are configured to store a network portion identity code of said second network portion as a preferred network portion identity code.

19. The mobile communications system of claim 18, wherein said second plurality of mobile stations are configured to store a network portion identity code of said first network portion as a preferred network portion identity code.

20. The mobile communications system of claim 17, wherein said first plurality of mobile stations are configured to alter said service indicator in response to a detection by said first plurality of mobile stations of a change in a cell identity of a serving communications cell.

21. The mobile communications system of claim 17, wherein said first plurality of mobile stations are configured to alter said service indicator in response to receipt of a predetermined dedicated control signal from the cellular communications network.

22. The mobile communications system of claim 17, wherein said second network portion comprises a base station controller which exclusively serves said second network portion.

23. The mobile communications system of claim 17, further comprising a base station controller which serves both said first network portion and said second network portion.

24. The mobile communications system of claim 17, wherein said first network portion and said second network portion operate using radio frequencies within a single operator-allocated frequency group.

25. The mobile communications system of claim 17, wherein the system is adapted to hand over service of said first plurality of mobile stations between said first network portion and said second network portion.

26. The mobile communications system of claim 25, wherein the system is further adapted to hand over service of said first plurality of mobile stations from said second network portion to said first network portion when a call is in progress in said second network portion.

27. The mobile communications system of claim 25, wherein the system is further adapted to hand over service of said first plurality of mobile stations from said first network portion to said second network portion when a call is in progress in said first network portion.

28. The mobile communications system of claim 25, wherein the system is further adapted to prevent hand over of service of any selected one of said second plurality of mobile stations from said first network portion to said second network portion when a call is in progress in said second plurality of network portion.

29. The mobile communications system of claim 17, wherein said radio interface protocol is in accordance with a technical specification selected from a plurality of mobile communications standards, said mobile communications standards including a global standard for mobile communications (GSM).

30. The mobile communications system of claim 17, wherein the system is configured so that different charging tariffs or sets of services are available to said first plurality of mobile stations in said second network portion than in said first network portion.

31. The mobile communications system of claim 17, further comprising a plurality of separate second network portions each configured to allow said first plurality of mobile stations to register for service therein.

32. The mobile communications system of claim 17, further comprising a plurality of separate second network portions and a plurality of sets of mobile stations which are configured to be capable of registering for service therein, wherein a selected one of said sets of mobile stations is configured to be prevented from registering for service in a second network portion other than a corresponding one of said second network portions.

33. The mobile communications system of claim 32, wherein the system includes less sets of mobile stations than separate second network portions.

* * * * *

UNITED STATES PATENT AND TRADEMARK OFFICE
CERTIFICATE OF CORRECTION

PATENT NO. : 6,826,414 B1
DATED : November 30, 2004
INVENTOR(S) : Reynolds et al.

Page 1 of 1

It is certified that error appears in the above-identified patent and that said Letters Patent is hereby corrected as shown below:

Title page,
Item [73], Assignee, delete "Communciations" and insert -- Communications --.

Column 12,
Line 8, delete "system,comprising" and insert -- system, comprising --.

Column 13,
Line 16, delete "code." and insert -- code and a network portion identity code of said second network portion as a forbidden network portion identity code. --.

Signed and Sealed this

Fourth Day of April, 2006

JON W. DUDAS
*Director of the United States Patent and Trademark Office*